United States Patent
Knox et al.

(10) Patent No.: US 10,055,976 B2
(45) Date of Patent: Aug. 21, 2018

(54) USING DEVICE DATA COLLECTED FROM OTHER PROXIMATE DEVICES

(71) Applicant: Lenovo (Singapore) Pte. Ltd., Singapore, SC (US)

(72) Inventors: Jonathan Gaither Knox, Morrisville, NC (US); Peter Hamilton Wetsel, Raleigh, NC (US); Rod D. Waltermann, Rougemont, NC (US); Suzanne Marion Beaumont, Wake Forest, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 145 days.

(21) Appl. No.: 14/340,679

(22) Filed: Jul. 25, 2014

(65) Prior Publication Data

US 2016/0027296 A1    Jan. 28, 2016

(51) Int. Cl.
   *G08C 17/02*    (2006.01)
(52) U.S. Cl.
   CPC .................................. *G08C 17/02* (2013.01)
(58) Field of Classification Search
   CPC ...................................................... G08C 17/02
   See application file for complete search history.

(56) References Cited

U.S. PATENT DOCUMENTS

| | | | | |
|---|---|---|---|---|
| 2012/0053823 | A1* | 3/2012 | Wilson | G08G 1/0104 701/119 |
| 2014/0244156 | A1* | 8/2014 | Magnusson | G01C 21/34 701/418 |
| 2015/0046022 | A1* | 2/2015 | Bai | G07C 5/008 701/31.5 |
| 2015/0091790 | A1* | 4/2015 | Forutanpour | G06F 3/011 345/156 |
| 2016/0014141 | A1* | 1/2016 | Ganapathy | H04W 12/06 726/28 |
| 2016/0214535 | A1* | 7/2016 | Penilla | G06Q 20/18 |
| 2016/0341557 | A1* | 11/2016 | Kondo | G01C 21/28 |

* cited by examiner

Primary Examiner — Laura Nguyen
(74) Attorney, Agent, or Firm — Ference & Associates LLC

(57) ABSTRACT

An embodiment provides a method, including: in a first end user electronic device, running an application that uses device collected data; collecting, using the first end user electronic device, device data for the application; accessing, using a processor of the first end user electronic device, device data collected by another end user electronic device proximate to the first end user electronic device; and using, in the running of the application, one or more of the accessed device data and the collected device data. Other embodiments are described and claimed.

22 Claims, 3 Drawing Sheets

USING DEVICE DATA COLLECTED FROM OTHER PROXIMATE DEVICES

BACKGROUND

End user electronic devices ("devices"), for example laptop computers, tablets, smart phones, desktop computers, smart TVs, navigation devices, automobile consoles, etc., may be used to collect data for use in running applications. For example, many devices include a data collection element such a sensor that collects or captures image input, temperature, voice input, gesture input, touch input, location data, and the like. Such data, collected by the device, is used in running the application.

Common examples include collecting voice input data for use as voice commands, collection of temperature data for use in weather applications, collection of location data for use in navigation or location-based applications, etc. Using such collected data, applications that run on an end user device can provide additional capabilities and features.

BRIEF SUMMARY

In summary, one aspect provides a method, comprising: in a first end user electronic device, running an application that uses device collected data; collecting, using the first end user electronic device, device data for the application; accessing, using a processor of the first end user electronic device, device data collected by another end user electronic device proximate to the first end user electronic device; and using, in the running of the application, one or more of the accessed device data and the collected device data.

Another aspect provides an end user electronic device, comprising: a sensor; a processor; and a memory device that stores instructions executable by the processor to: run an application that uses sensor data; collect, using the sensor, sensor data for the application; access data collected by another end user electronic device proximate to the first end user electronic device; and use, in the running of the application, one or more of the accessed data and the collected sensor data.

Another aspect provides a product, comprising: a storage device having code stored therewith, the code being executable by a processor and comprising: code that, in a first end user electronic device, runs an application that uses device collected data; code that collects, using the first end user electronic device, device data for the application; code that accesses device data collected by another end user electronic device proximate to the first end user electronic device; and code that uses, in the running of the application, one or more of the accessed device data and the collected device data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
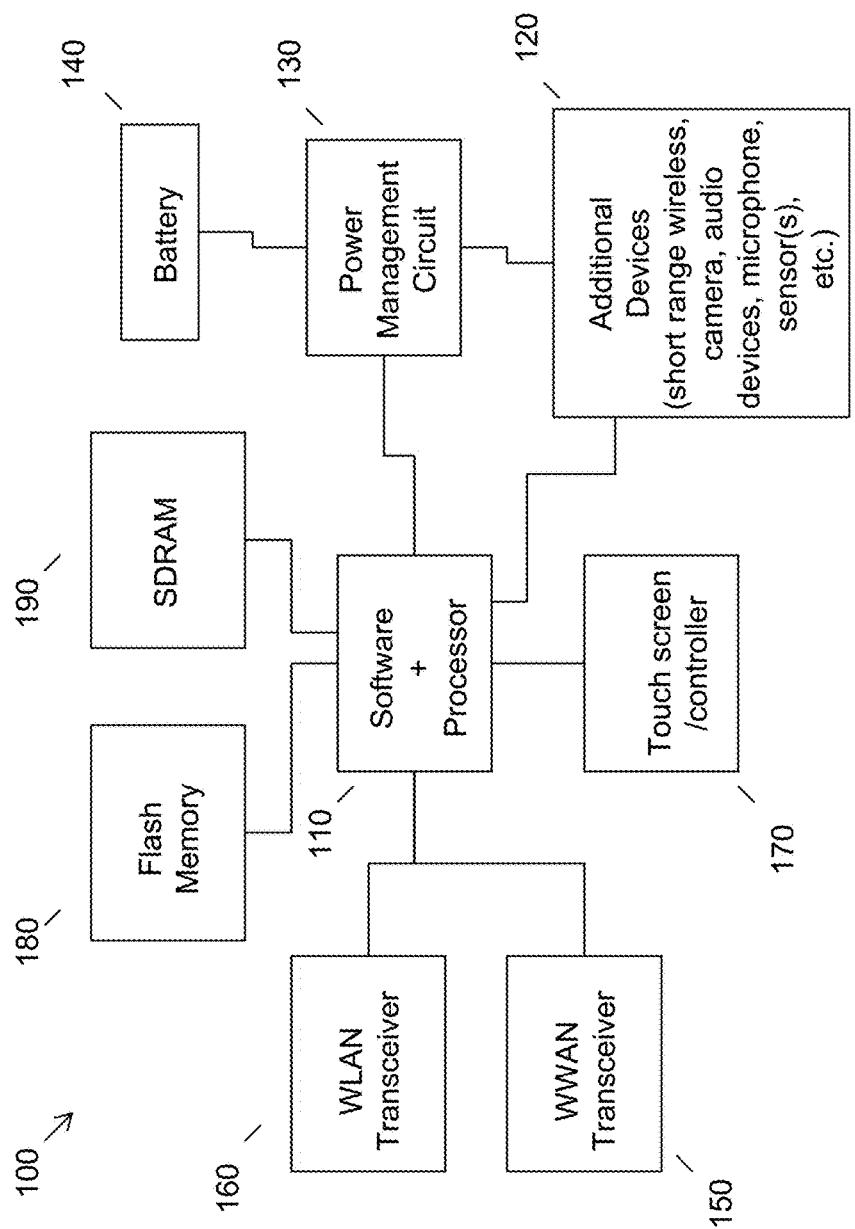
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventionally devices tend to rely on their own data collection capabilities. Thus, a device may be limited in the quality of data it has access to or the device may have no access to data at all depending on which data collection element(s) the device has on board. For example, a device that lacks a camera may not be capable of detecting gestures at a distance and using the same in an application that allows for gesture inputs. Likewise, a device not having a GPS receiver may have limited access to location services, e.g., using triangulation from cellular base stations instead. A difficulty thus arises in determining how an end user device might gain access to the best or highest quality sensor data available.

Because most devices include a communication capability, this affords an opportunity to gather data collected from a group of devices. Thus, as currently a device only uses its own sensor data, it is possible for another device to provide more capabilities to the particular device in question, i.e., by using sensor data from other devices.

Accordingly, an embodiment provides an end user electronic device with expanded capabilities with respect to running applications that use device collected data, even if the particular end user electronic device does not have a particular data collection element conventionally thought necessary.

An embodiment thus provides a method for contextually aware devices to automatically determine the most appropriate device from which to use sensor data. One way in which the confidence of the external data may be determined is by employing proximity. That is, the end user electronic device may access data collected by co-located or proximate devices. The most appropriate data therefore may be assigned to the device that is in closest proximity. Many alternatives or combinations exist, e.g., data may be used from the device that has the most accurate sensors, or the device which simply has the most recent raw data, etc.

Using an embodiment, a device without a particular sensor may query devices in close proximity for sensor data it does not have. By way of example, device A requires sensor data only available through device B. Device A requests and receives the data from device B. This allows device A to complete its task, e.g., in running an application (e.g., a location-based service or capability offered by the application).

Similarly, a device may choose to use sensor data from a different device if the other device's data is more precise or more current. Additionally or in the alternative, a device may choose to use the sensor data from another device to verify its own data, if its own data carries a low confidence level or is of reduced quality or type. In all examples, the alternative "other" or "another" device may be either a single device or a set of devices. For example, an embodiment may select data from a federation of a user's personal devices and/or other user's devices.

Data may be assigned a confidence score for use in selecting data to be provided to an application. For example, a sensor of a particular type may be assigned a higher confidence level than a sensor of another type, whereby the data derived from each of these sensors may be assigned differing quality scores generally and thus may be assigned different confidence levels. Likewise, device proximity, e.g., to a user providing input, may be given higher priority and thus a higher confidence level may be assigned to its data. In an embodiment, a processing step may occur wherein aggregated data may be analyzed using a parameter of interest or usefulness to an application, e.g., audibility of words contained in speech input data, such that the highest quality data is selected for use by an application, e.g., even if collected or sensed by another device.

Also to be considered is the timeline in which these evaluations are made. The evaluations could all, of course, be made in real-time. But the evaluations also maybe made after the fact, e.g., through examination of data stored in a database. In this case, an embodiment may award contextual awareness to a system or a device, where the devices themselves may not necessarily be aware of each other, e.g., in real-time.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system design found for example in tablet or other mobile computing platforms. Software and processor(s) are combined in a single unit 110. Processors comprise internal arithmetic units, registers, cache memory, busses, I/O ports, etc., as is well known in the art. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces, for example, include SDIO and I2C.

There are power management circuits(s) 130, e.g., a battery management unit, BMU, which manages power as supplied, for example, via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, one of the additional devices 120 is commonly a data collection element in the form of a sensor such as a microphone, which may include physical elements that transform sound waves into an electrical audio signal. Additional devices 120 may also include communication elements, e.g., short range wireless or other communication elements, such as near field communication elements, which allow for communications and data exchange with other proximately located devices. Commonly, system 100 will include a touch screen 170 for data input and display/rendering. System 100 also typically includes various memory devices, for example flash memory 180 and SDRAM 190.

Figure 2:
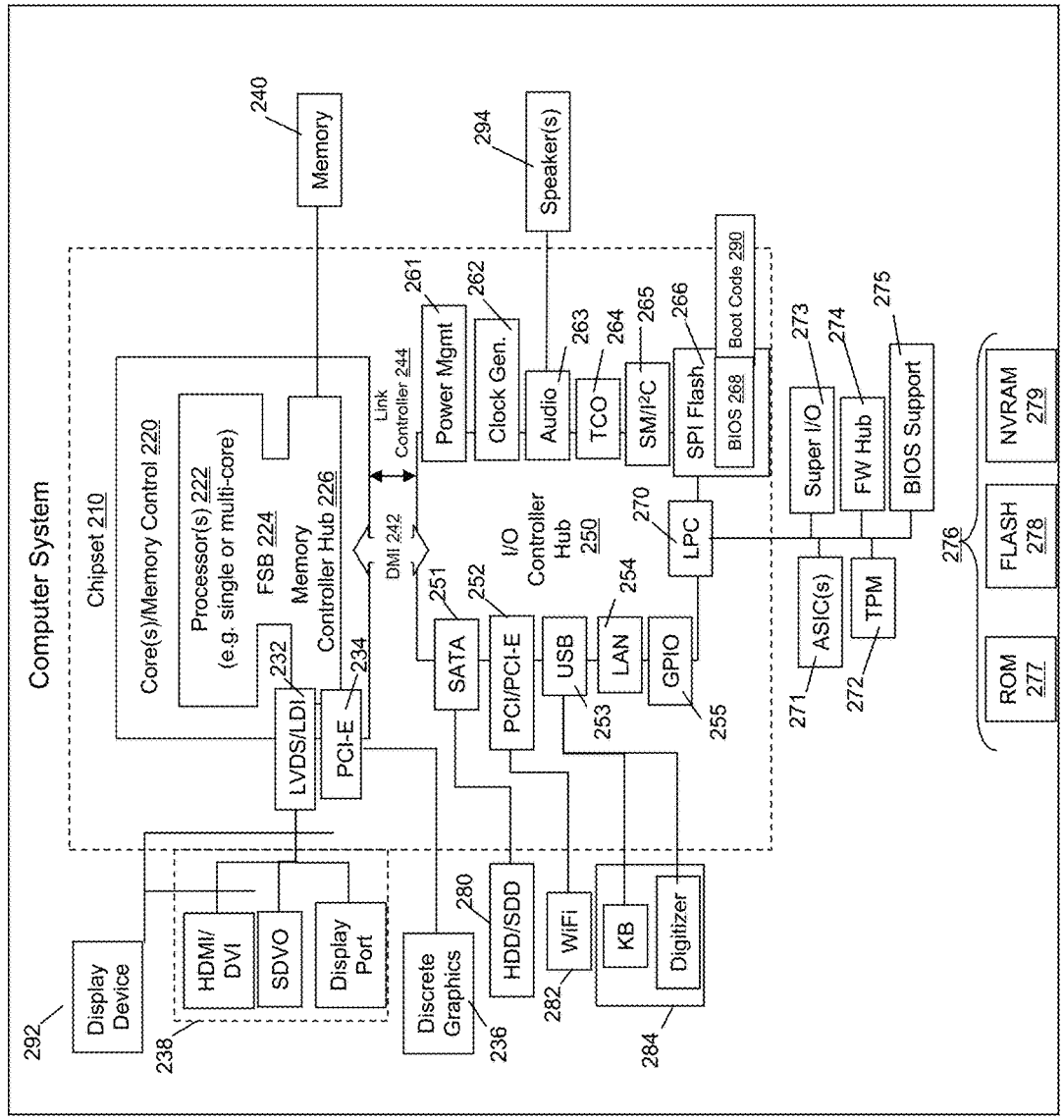
FIG. 2 illustrates another example of an information handling device.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that collect and use device data for running applications. For example, such circuitry may be used by an end user device such as a laptop, tablet, smart phone, smart TV, etc., that runs an application allowing voice input, gesture input, etc., or allows the device to enhance the accuracy or quality of an application's functioning using location data, temperature data, etc.

Figure 3:
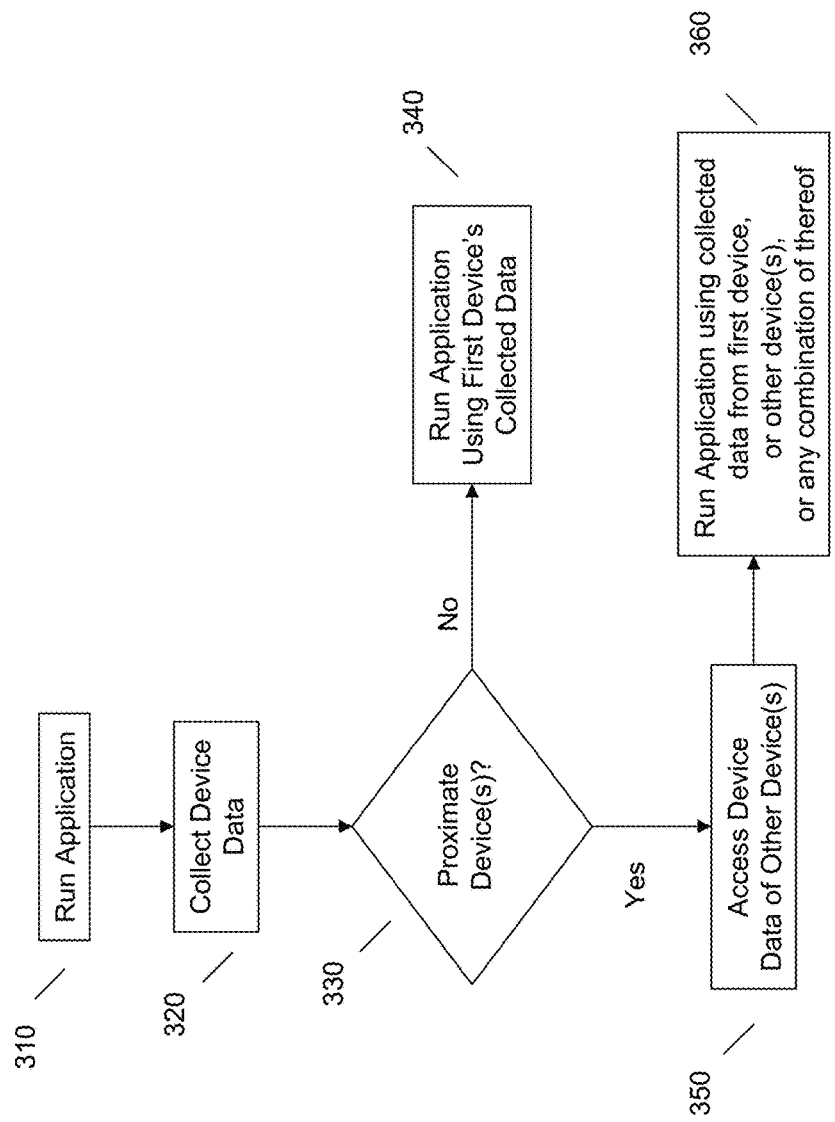
FIG. 3 illustrates an example method of using device collected data from other proximate devices.

In FIG. 3, an example method is illustrated for using device collected data from other proximate devices. In an example embodiment, a first end user electronic device runs an application that uses device collected data at 310. As such, the application uses data collected by the first end user electronic device, e.g., location data, audio data captured via a microphone, etc. Thus, the first end user electronic device may collect device data at 320.

It is worth noting that the device data generally (whether collected by a first device or by another device) may be derived from a variety of device components and/or sensors, and may include but is not necessarily limited to the above types of data. In this regard, the device data used by an application may include but is not limited to keyboard input data, mechanical input data, orientation data, acceleration data, directional data (e.g., as derived from a gyroscope or compass), speech recognition data (e.g., processed data such as speech to text data, etc.), image data, timing information or data, which may be associated with other data types. Thus, many different data types may be shared between devices to improve application performance.

By way of specific example, the first end user device may be running an application, such as a web browser application or a map application, which uses location data to enhance services offered. The first electronic device may collect such location data using any data collection elements it has on board, if any. For example, the first end user electronic device may not have a GPS receiver and thus the location data may be limited to triangulation type location data derived from a WWAN receiver or the like. Alternatively, the first end user device may have no location data collection mechanism (either by lack of a necessary sensor or data collection element or its practical unavailability, e.g., because of a low battery, etc.) such that location services are not offered, even though this is a feature supported by the application (i.e., step 320 may be omitted entirely).

According to an embodiment, the first end user electronic device may determine that there are proximate device(s) at 330. This may take a variety of forms, e.g., direct communication via short range wireless capabilities, via being informed, e.g., via a cloud account device that knows the location and identity of a co-located or proximate device, etc. If there is one or more proximate device, as determined at 330, an embodiment may access device data collected the other device at 350. Of course, if no such device is proximate or available, the first electronic device may continue to operate on its own, i.e., run the application using the first device's collected data, if any, at 340.

If other device data is available to the first electronic device, this may be used in running the application at 360. For example, the other device's data may be used instead of the first end user electronic device's data, may be used to supplement or compliment the first end user electronic device's data, to confirm other data collected by the first device or other proximately located devices, etc.

For example, an embodiment may select data from a federation of a user's personal devices and/or other user's devices at 360 for use in running an application. In the selection between data from the first end user device and the other device(s) that make their data available, data may be assigned a confidence score for use in selecting data to be provided to an application. For example, a sensor of a particular type may be assigned a higher confidence level than a sensor of another type, whereby the data derived from each of these sensors may be differentiated according to different confidence levels. Likewise, device proximity, e.g., to a user providing input, may be given higher priority and thus a higher confidence level may be assigned to its data. Thus, at 360 an embodiment may choose to use data of another device which is closer to a user providing speech inputs.

In an embodiment, a processing step may occur wherein aggregated data (i.e., data collected from a variety of devices) is analyzed at 360, e.g., using a parameter of interest or usefulness to an application such as audibility of words contained in speech input data, image data containing recognized gesture inputs, etc., such that the highest quality data is selected for use by an application, e.g., even if collected or sensed by another device and/or even if other data is available for use by the application.

By way of example, the first end user electronic device may lack GPS data owing to not having an appropriate sensor. If so, and if the first end user electronic device accesses another end user electronic device, e.g., proximately located smart phone of the user, the first end user electronic device (e.g., a laptop) may use the smart phone's GPS data in running the application on the laptop. In this way, the first end user electronic device will be capable of enhancing the function of the application even though it does not have the appropriate sensor(s) to do so.

By way of further example, a first end user device, e.g., a smart TV, may not have an on-board microphone for accepting voice commands. However, using an embodiment, the smart TV may be provided with data collected by another of the user's device, e.g., smart phone, tablet, etc., located in the same room as the smart TV. Thus, the user may provide voice commands to operate an application running on the smart TV, even though the smart TV does not support the input modality as a device. Other examples are numerous but will be apparent to those skilled in the art, e.g., touch input capabilities may be provided to devices lacking touch sensitive surfaces, gesture input capabilities may be provided to devices lacking a camera, etc.

It is worth noting that the data collected by other devices may be accessed by the first end user electronic device at 330 in a variety of ways. This may depend on other capabilities of the devices involved. For example, if the devices are capable of direct communication, the devices may communicate directly, e.g., as paired and connected devices over short range wireless, in a personal area network, etc. If the devices cannot communicate directly, for whatever reason (e.g., not appropriately configured, lack necessary communication elements, etc.), the devices may communicate indirectly, e.g., via a network device, such as a cloud computing device that coordinates communications between a user's registered devices.

In a similar fashion, the nature of the collected data exchanged may be different depending on the devices involved. By way of example, devices that have similar applications but dissimilar sensors may exchange raw or unprocessed sensor data, as each device may be capable of processing such unprocessed sensor data, with one device lacking a necessary sensor for its collection. Alternatively, it may often occur that some processing is required for the exchanged or communicated data to be useful to the receiving device. Thus, the other device that collects the data may preprocess it into a useable format for a requesting device, e.g., processed for use by a requesting application of the first electronic device. As will be readily apparent to those having ordinary skill in the art, other devices, e.g., a cloud account or other network located device, may be involved in the data processing.

As described herein an embodiment provides techniques for identifying and collecting the most appropriate data for use by an end user electronic device. This greatly expands the end user electronic device's capabilities by allowing it to have access to additional data that it may not be able to collect. The additional data available via other devices need not completely substitute for the first device's data. Thus, the first end user device may evaluate the additional data that is available to determine if it is of some use, e.g., as input to an application, as confirming data already collected by the first device, etc. Additionally, the first device may access the additional data in real time or near real time, or the additional data may be stored, evaluated, and later accessed. As with other processes described herein, the storing, evaluation, etc., may be conducted by one or more devices, e.g., the requesting end user device, the providing end user device, a cloud account or networked device, etc.

As will be understood by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:
1. A method, comprising:
in a first end user electronic device, running an application that uses device collected data;
collecting, using the first end user electronic device, device data for the application;

accessing, using a processor of the first end user electronic device, device data collected by another end user electronic device proximate to the first end user electronic device;

selecting one of the accessed device data and the collected device data to be used in the running of the application, wherein the selecting comprises identifying from the accessed device data and the collected device data the device data having a higher priority, wherein the priority is assigned based upon a sensor proximity to the user, a precision of the accessed device data as compared to a precision of the collected device data, and a time of capture associated with the accessed device data as compared with a time of capture associated with the collected device data; and using, in the running of the application, the device data selected.

2. The method of claim 1, further comprising identifying that the another electronic device is proximate to the first end user electronic device.

3. The method of claim 1, wherein the using comprises aggregating the collected device data and the accessed device data.

4. The method of claim 1, wherein the using comprises replacing the collected device data with the accessed device data.

5. The method of claim 1, wherein the collected device data and the accessed device data are different types of data.

6. The method of claim 1, wherein the collected device data and the accessed device data are each sensor derived data.

7. The method of claim 6, wherein the sensor derived data is selected from the group of data consisting of: sensed audio data, sensed location data, and sensed gesture data.

8. The method of claim 6, wherein the sensor derived data is selected from the group of data consisting of: sensed temperature data, sensed motion data and sensed touch input data.

9. The method of claim 1, wherein the accessing comprises direct communication between the first end user electronic device and the another end user electronic device.

10. The method of claim 1, wherein the accessing comprises indirect communication between the first end user electronic device and the another device involving an intermediary device.

11. The method of claim 10, wherein the intermediary device comprises a cloud device associating the first end user electronic device and the another end user electronic device.

12. A first end user electronic device, comprising:
a sensor;
a processor; and
a memory device that stores instructions executable by the processor to:
run an application that uses device data;
collect, using the sensor, device data for the application;
access device data collected by another end user electronic device proximate to the first end user electronic device;
select one of the accessed device data and the collected device data to be used in the running of the application, wherein the instructions to select comprise instructions to identify from the accessed device data and the collected device data the device data having a higher priority, wherein the priority is assigned based upon a sensor proximity to the user, a precision of the accessed device data as compared to a precision of the collected device data, and a time of capture associated with the accessed device data as compared with a time of capture associated with the collected device data; and use, in the running of the application, the device data selected.

13. The first end user electronic device of claim 12, wherein the instructions are further executable by the processor to identify that the another electronic device is proximate to the first end user electronic device.

14. The first end user electronic device of claim 12, wherein to use comprises aggregating the collected device data and the accessed device data.

15. The first end user electronic device of claim 12, wherein to use comprises replacing the collected device data with the accessed device data.

16. The first end user electronic device of claim 12, wherein the collected device data and the accessed device data are different types of data.

17. The first end user electronic device of claim 11, wherein the collected device data and the accessed device data are each sensor derived data.

18. The first end user electronic device of claim 17, wherein the sensor derived data is selected from the group of data consisting of: sensed audio data, sensed location data, and sensed gesture data.

19. The first end user electronic device of claim 17, wherein the sensor derived data is selected from the group of data consisting of: sensed temperature data, sensed motion data and sensed touch input data.

20. The first end user electronic device of claim 12, wherein to access comprises direct communication between the first end user electronic device and the another end user electronic device.

21. The first end user electronic device of claim 12, wherein to access comprises indirect communication between the first end user electronic device and the another end user electronic device involving an intermediary device.

22. A product, comprising:
a storage device having code stored therewith, the code being executable by a processor and comprising:
code that, in a first end user electronic device, runs an application that uses device collected data;
code that collects, using the first end user electronic device, device data for the application;
code that accesses device data collected by another end user electronic device proximate to the first end user electronic device;
code that selects one of the accessed device data and the collected device data to be used in the running of the application, wherein the code that selects comprises code that identifies from the accessed device data and the collected device data the device data having a higher priority, wherein the priority is assigned based upon a sensor proximity to the user, a precision of the accessed device data as compared to a precision of the collected device data, and a time of capture associated with the accessed device data as compared with a time of capture associated with the collected device data; and
code that uses, in the running of the application, the device data selected.

* * * * *